(12) United States Patent
Kobayashi et al.

(10) Patent No.: US 11,745,527 B2
(45) Date of Patent: Sep. 5, 2023

(54) PRESSURE SENSITIVE TRANSFER CORRECTING TAPE

(71) Applicant: Tombow Pencil Co., Ltd., Tokyo (JP)

(72) Inventors: Keitaro Kobayashi, Yokohama (JP); Kazuhisa Aoki, Hachioji (JP); Akihiro Sakamoto, Kobe (JP)

(73) Assignee: Tombow Pencil Co., Ltd., Tokyo (JP)

( * ) Notice: Subject to any disclaimer, the term of this patent is extended or adjusted under 35 U.S.C. 154(b) by 0 days.

(21) Appl. No.: 16/352,450

(22) Filed: Mar. 13, 2019

(65) Prior Publication Data

US 2019/0283476 A1    Sep. 19, 2019

(30) Foreign Application Priority Data

Mar. 13, 2018 (JP) .................................. 2018-045133

(51) Int. Cl.
*B41J 31/09* (2006.01)
*C08K 3/36* (2006.01)

(52) U.S. Cl.
CPC ................. *B41J 31/09* (2013.01); *C08K 3/36* (2013.01)

(58) Field of Classification Search
CPC ........ B41J 31/09; B41J 29/367; B41J 29/373; B41J 29/36; B41J 31/00; B41J 31/05; B41J 31/06; B41J 31/08; B43L 19/00; C09J 7/50; C08K 3/36; B41M 2205/16;

(Continued)

(56) References Cited

U.S. PATENT DOCUMENTS 3,924,728 A * 12/1975 Brown ........................ C09J 7/38
400/696
4,959,046 A    9/1990 Brunetto et al.
(Continued)

FOREIGN PATENT DOCUMENTS

EP    0427870 A1    11/1991
JP    0288057 A    3/1990
(Continued)

OTHER PUBLICATIONS

Sep. 15, 2015, International Search Report and Written Opinion of the International Searching Authority from the Japan Patent Office in PCT/JP2015/068430, which is an international application of Applicant Tombow Pencil Co., Ltd.

(Continued)

*Primary Examiner* — Scott R. Walshon
(74) *Attorney, Agent, or Firm* — Kolitch Romano Dascenzo Gates LLC

(57) ABSTRACT

Pressure sensitive transfer correcting tape disclosed herein has improved resistance to bleeding from a line drawn with a ballpoint pen or the like. The pressure sensitive transfer correcting tape may include a release substrate including paper or a plastic film and a pressure sensitive transfer layer including at least a correcting and covering layer and a pressure sensitive adhesive layer laminated sequentially on one side of the release substrate. The correcting and covering layer contains porous silica and acid-modified rosin. In some examples, the oil absorption of the porous silica is preferably in a range of from 100 to 320 ml/100 g, and the acid value of the acid-modified rosin is preferably 180 mg KOH/g or more.

11 Claims, 2 Drawing Sheets

(58) Field of Classification Search
CPC ........... B41M 5/124–128; C09D 10/00; B65H 37/007; B43M 11/00; B43M 11/06; B65C 11/004
See application file for complete search history.

(56) References Cited

U.S. PATENT DOCUMENTS

| | | | |
|---|---|---|---|
| 5,013,603 A * | 5/1991 | Ogawa | B41M 5/5218 347/105 |
| 5,597,633 A | 1/1997 | Mecke et al. | |
| 5,759,341 A | 6/1998 | Kobayashi | |
| 5,991,568 A | 11/1999 | Ziegelmuller et al. | |
| 7,228,882 B2 | 6/2007 | Marschand et al. | |
| 9,821,347 B2 | 11/2017 | Nakane | |
| 9,969,590 B2 | 5/2018 | Fujisawa | |
| 2002/0088554 A1 | 7/2002 | Bouveresse et al. | |
| 2005/0075419 A1* | 4/2005 | Kwan | C09D 10/00 524/425 |
| 2006/0172093 A1* | 8/2006 | Watanabe | B41M 5/502 428/32.24 |
| 2009/0026302 A1 | 1/2009 | Kinugasa et al. | |
| 2009/0050275 A1 | 2/2009 | Sakanishi | |
| 2009/0185849 A1 | 7/2009 | Narita | |
| 2009/0205785 A1 | 8/2009 | Rolion et al. | |
| 2010/0084095 A1 | 4/2010 | Sekiya et al. | |
| 2011/0244136 A1 | 10/2011 | Ryabova | |
| 2012/0267047 A1 | 10/2012 | Maus et al. | |
| 2014/0318700 A1 | 10/2014 | Henderson et al. | |
| 2016/0009113 A1* | 1/2016 | Uetake | C09J 7/401 428/32.22 |
| 2017/0247792 A1 | 8/2017 | Kobashi | |
| 2018/0015775 A1 | 1/2018 | Tamura | |

FOREIGN PATENT DOCUMENTS

| | | |
|---|---|---|
| JP | 05-178525 A | 7/1993 |
| JP | 06073025 U | 10/1994 |
| JP | H09-71097 A | 3/1997 |
| JP | 2876301 B2 | 4/1997 |
| JP | H09-104562 A | 4/1997 |
| JP | H09-124219 A | 5/1997 |
| JP | H10-52995 A | 2/1998 |
| JP | 10-181289 A | 7/1998 |
| JP | 11-1095 A | 1/1999 |
| JP | 2004058673 A * | 2/2004 |
| JP | 2005-47201 A | 2/2005 |
| JP | 3870986 B2 | 1/2007 |
| JP | 2007083627 A * | 4/2007 |
| JP | 2011-121204 A | 6/2011 |
| JP | 2011126241 A * | 6/2011 |
| JP | 2011-245696 A | 12/2011 |
| JP | 2013208898 A * | 10/2013 |
| JP | 2016-124131 A | 7/2016 |
| JP | 6247199 B2 | 12/2017 |

OTHER PUBLICATIONS

Oct. 6, 2015, International Search Report and Written Opinion of the International Searching Authority from the Japan Patent Office, dated Oct. 6, 2015, in PCT/JP2015/068432, which is s an international application of Applicant Tombow Pencil Co., Ltd.

Jun. 27, 2017, International Search Report and Written Opinion of the International Searching Authority from the Japan Patent Office in PCT/JP2017/011867, which is an international application of Applicant Tombow Pencil Co., Ltd.

Aug. 3, 2018, Non-final Office Action from the United States Patent Office, in U.S. Appl. No. 15/539,863, which is a co-pending application of Applicant Tombow Pencil Co., Ltd.

Apr. 19, 2019, final Office Action from the United States Patent Office, in U.S. Appl. No. 15/539,863, which is a co-pending application of Applicant Tombow Pencil Co., Ltd.

Apr. 25, 2019, Non-final Office Action from the United States Patent Office, in U.S. Appl. No. 15/534,698, which is a co-pending application of Applicant Tombow Pencil Co., Ltd.

* cited by examiner

| Division | | | | | | | | | | | | | | | Evaluation | | | |
|---|---|---|---|---|---|---|---|---|---|---|---|---|---|---|---|---|---|---|
| Material | | | | | | | | | | | | | | | (1) Coating property resistance | (2) Crack resistance | (3) Rewriting property | (4) Bleeding resistance |
| Detail | Binder resin, dispersing agent and the like | Acid-modified resin | | | Pigment, extender pigment | Porous silica | | | | | | | | Sum (parts by weight dried) | | | | |
| | | | | | | Sol-gel method | | | | | | | Sedimentation method | | | | | |
| | | Acid value 320 (mg KOH/g) | Acid value 240 (mg KOH/g) | Acid value 165 (mg KOH/g) | | Oil absorption 320 (mL/100 g) | Oil absorption 300 (mL/100 g) | Oil absorption 280 (mL/100 g) | Oil absorption 230 (mL/100 g) | Oil absorption 200 (mL/100 g) | Oil absorption 180 (mL/100 g) | Oil absorption 160 (mL/100 g) | Oil absorption 100 (mL/100 g) | Oil absorption 240 (mL/100 g) | | | | | |
| Example 1 | 21.0 | 1.0 | | | 75.0 | | | | | 3.0 | | | | | 100.0 | ◎ | ○ | ○ | ◎ |
| Example 2 | 21.0 | | 1.0 | | 75.0 | | | | | 3.0 | | | | | 100.0 | ○ | ○ | ○ | ○ |
| Example 3 | 21.0 | | | 1.0 | 75.0 | | | | | 3.0 | | | | | 100.0 | △ | △ | ○ | ○ |
| Example 4 | 21.0 | 1.0 | | | 75.0 | | | | 3.0 | | | | | | 100.0 | △ | △ | ○ | ◎ |
| Example 5 | 21.0 | 1.0 | | | 75.0 | | | | | 3.0 | | | | | 100.0 | ○ | ○ | ○ | ○ |
| Example 6 | 21.0 | 1.0 | | | 75.0 | | | | | | 3.0 | | | | 100.0 | ○ | ○ | ○ | ◎ |
| Example 7 | 20.7 | 0.5 | 0.8 | | 75.0 | | | | | 3.0 | | | | | 100.0 | ○ | ○ | △ | ◎ |
| Example 8 | 21.0 | | 0.5 | 0.5 | 74.0 | | | | | 4.0 | | | | | 100.0 | ○ | ○ | ○ | ◎ |
| Example 9 | 21.0 | 1.0 | | | 75.0 | | | | 1.5 | 3.0 | 1.5 | | | | 100.0 | ○ | ○ | ○ | ◎ |
| Example 10 | 21.0 | 1.0 | | | 74.5 | | | 0.5 | | 3.0 | | | | | 100.0 | ○ | ○ | ○ | ◎ |
| Example 11 | 20.0 | 2.0 | | | 77.5 | | | 0.5 | | | | | | | 100.0 | ○ | ○ | ○ | △ |
| Example 12 | 20.5 | 1.5 | | | 77.0 | | 0.5 | | 1.0 | | | | | | 100.0 | ○ | ○ | ○ | ○ |
| Example 13 | 20.5 | 1.5 | | | 76.0 | | | | | 2.0 | 5.0 | | | | 100.0 | ○ | ○ | ○ | ◎ |
| Example 14 | 20.0 | | 2.0 | | 73.0 | | | | | | 10.0 | | | | 100.0 | ○ | ○ | ○ | ◎ |
| Example 15 | 19.0 | | 3.0 | | 68.0 | | | | | | | 20.0 | | | 100.0 | ○ | △ | ○ | ◎ |
| Example 16 | 17.0 | | 5.0 | | 58.0 | | | | | | | | 20.0 | | 100.0 | △ | △ | △ | △ |
| Example 17 | 21.9 | 0.1 | | | 75.0 | | | | | 3.0 | | | | | 100.0 | ○ | ○ | ○ | ○ |
| Example 18 | 21.8 | 0.2 | | | 75.0 | | | | | 3.0 | | | | | 100.0 | △ | △ | ○ | △ |
| Example 19 | 21.6 | 0.4 | | | 75.0 | | | | | 3.0 | | | | | 100.0 | ○ | ○ | ○ | ◎ |
| Example 20 | 20.0 | 2.0 | | | 77.5 | | 0.5 | | | | | | | | 100.0 | △ | △ | △ | △ |
| Example 21 | 20.0 | 2.0 | | | 77.7 | 0.3 | | | | | | | | | 100.0 | △ | △ | ○ | △ |
| Example 22 | 17.0 | 5.0 | | | 58.0 | | | | | | | | 20.0 | | 100.0 | △ | △ | △ | △ |
| Example 23 | 20.5 | 1.5 | | | 77.0 | | | | | | | | | 1.0 | 100.0 | △ | ○ | ○ | ○ |
| Example 24 | 20.0 | 2.0 | | | 74.0 | | | | | 3.0 | | | | 1.0 | 100.0 | ○ | ○ | ○ | ◎ |

FIG. 1

| Division | | | | | | Porous silica | | | | | | | Sum (parts by weight dried) | Evaluation | | | |
|---|---|---|---|---|---|---|---|---|---|---|---|---|---|---|---|---|---|
| Material | Binder resin, dispersing agent and the like | Acid-modified resin | | | Resin ester | Pigment / extender pigment | Sol-gel method | | | | | Sedimentation method | | | (1) Coating property | (2) Crack resistance | (3) Rewriting property | (4) Bleeding resistance |
| Detail | | Acid value 320 (mg KOH/g) | Acid value 240 (mg KOH/g) | Acid value 185 (mg KOH/g) | Acid value 7 or less (mg KOH/g) | | Oil absorption 320 (ml/100 g) | Oil absorption 300 (ml/100 g) | Oil absorption 280 (ml/100 g) | Oil absorption 230 (ml/100 g) | Oil absorption 200 (ml/100 g) | Oil absorption 160 (ml/100 g) | Oil absorption 100 (ml/100 g) | Oil absorption 240 (ml/100 g) | | | | |
| Comparative Example 1 | 22.0 | | | | | 78.0 | | | | | | | | | ○ | ○ | × | × |
| Comparative Example 2 | 21.0 | 1.0 | | | | 78.0 | | | | | | | | | ○ | ○ | △ | × |
| Comparative Example 3 | 22.0 | | | | | 75.0 | | | | | 3.0 | | | | × | × | △ | △ |
| Comparative Example 4 | 21.0 | | | | 1.0 | 75.0 | | | | | 3.0 | | | | × | × | △ | △ |

FIG. 2

PRESSURE SENSITIVE TRANSFER CORRECTING TAPE

FIELD

This disclosure relates to systems and methods for pressure sensitive transfer correcting tape to be used for concealing and correcting characters and the like recorded on a paper surface and the like. More specifically, the disclosed embodiments relate to a pressure sensitive transfer correcting tape exhibiting excellent bleeding resistance of a ballpoint pen ink and the like.

INTRODUCTION

Hitherto, correction liquids and cassette type pressure sensitive transfer correcting tapes having an automatic winding mechanism have been generally used when erasing and correcting lines, such as lines drawn with writing instruments such as ballpoint pens, fountain pens, and marking pens and lines copied by typewriters and PPC coping, which are not erased with an eraser. The time required for drying the correction liquid is long and the corrected portion is hardly smooth when such miswritten characters and the like are corrected with correction liquids, there is thus a problem that it is difficult to rewrite and reprint the characters. Pressure sensitive transfer correcting tapes are therefore often used.

Pressure sensitive transfer correcting tape is typically produced by coating one side of a release substrate made of paper or a plastic film with a coating ink for forming a correcting and covering layer (hereinafter referred to as "correcting and covering layer ink") and drying the coating ink to form a correcting and covering layer and then forming a pressure sensitive adhesive layer thereon. The correcting and covering layer ink generally includes extender pigments containing titanium oxide as a white pigment and magnesium carbonate, calcium carbonate, silica, talc, kaolin, diatomaceous earth and the like as a filler, binder resins and the like are dispersed in solvents using dispersing agents.

However, the binder resins and dispersing agents contained in the correcting and covering layer are often nonpolar in order to cope with the fact that the correcting and covering layer ink is often solvent-based. Hence, particularly when a line drawn with a ballpoint pen ink which contains a polar organic solvent as a main component, and thus exhibits high polarity and a high surface tension, is concealed with a pressure sensitive transfer correcting tape, a phenomenon known as a bleeding phenomenon occurs. This phenomenon is one in which the concealed drawn line rises to the surface of the correcting and covering layer over time (that is, the bleeding resistance deteriorates) in some cases, depending on the use environment. As a result, the characters that should have been concealed are readable or overlap the characters written on the correcting and covering layer, and the characters written on the correcting and covering layer are difficult to read.

Furthermore, in recent years, oil-based ballpoint pen inks providing improved performance over pens that, for example, have a lubricating property and blurring effect at the time of writing, by lowering the viscosity of the ink have been developed. In the invention described in JP-A-2004-107595, an oil-based ballpoint pen ink providing suppressed blurring at the time of writing and excellent smooth feel of writing was obtained using an alcohol solvent which does not have an aromatic ring in the molecule (namely, a higher polar organic solvent) but not an alcohol solvent which contains an aromatic ring and is conventionally used as a main solvent. Examples of the organic solvent to be used in such an oil-based ballpoint pen ink may include propylene glycol monomethyl ether 1,3-butanediol, 3-methoxybutanol, and 3-methoxy-3-methyl-1-butanol.

The bleeding phenomenon in the correcting and covering layer is more severe in the case of the lines drawn with the oil-based ink in which such a higher polar organic solvent is used.

JP-A-2013-208898 proposes a method of "preventing bleeding of ink from drawn lines and the like on the concealed paper surface and visual recognition of the drawn lines through the concealing layer" (that is, improving the bleeding resistance) by containing a polyester resin having an acid value of 5 mg KOH/g or less as a binder resin and silica having an oil absorption of from 280 to 430 ml/100 g as a filler in the concealing layer (correcting and covering layer) at from 3% to 35% by mass.

In such a configuration, bleeding resistance is improved by addition of porous silica having a great oil absorption but, at the same time, the binding power of the binder resin also decreases, and thus a problem arises that the concealing layer is brittle and easily breaks down to pieces. In addition, in order to solve this problem, a polyester resin is added but the flexibility thereof is low and there is thus a possibility that the coating film followability and crack resistance deteriorate.

JP-A-2007-083627 proposes a method of improving bleeding resistance by containing silica having an oil absorption of 150 g/100 g or less as a filler in the concealing layer (correcting and covering layer) at from 3% to 50% by weight and proposes a method of preventing penetration of aqueous ink and migration of a coloring agent to the surface by adding silica having a small surface area and low liquid absorbability. However, the bleeding resistance of the highly polar oil-based ink as described above remains insufficient by the use of silica having a low oil absorption.

SUMMARY

The present disclosure provides systems, apparatuses, and methods relating to pressure sensitive transfer correcting tape exhibiting excellent bleeding resistance.

In some embodiments, a pressure sensitive transfer correcting tape may include: a release substrate including paper or a plastic film; and a pressure sensitive transfer layer including at least a correcting and covering layer and a pressure sensitive adhesive layer laminated sequentially on one side of the release substrate, in which the correcting and covering layer contains porous silica and acid-modified rosin.

The porous silica may have an oil absorption in a range of 100 to 320 ml/100 g. The acid-modified rosin may have an acid value of 180 mg KOH/g or more. The correcting and covering layer may have a porous silica content of 0.3% to 20% by mass. The porous silica may include colloidal silica obtained by gelling silicic acid or a silicate. The correcting and covering layer may further contain at least one binder resin selected from synthetic rubber and an elastomer.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is a first table depicting evaluation data with respect to several illustrative materials that may be suitable for use with aspects of the present disclosure.

FIG. 2 is a second table depicting evaluation data with respect to several illustrative comparative materials.

DETAILED DESCRIPTION

Various aspects and examples of a pressure sensitive transfer correcting tape exhibiting excellent bleeding resistance, as well as related systems and methods, are described below and illustrated in the associated drawings. Unless otherwise specified, a pressure sensitive transfer correcting tape in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; and (4) Conclusion. The Examples, Components, and Alternatives section is further divided into subsections A through C, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Overview

An object of the present disclosure is to provide a pressure sensitive transfer correcting tape having a pressure sensitive transfer layer formed by sequentially laminating at least a correcting and covering layer and a pressure sensitive adhesive layer on a paper or plastic substrate having undergone a release treatment (hereinafter referred to as a release substrate) and having improved resistance to bleeding from a line drawn with a writing instrument containing oil-based ink or aqueous ink, such as a ballpoint pen, while maintaining good flexibility, cutting property, and rewriting property of the correcting and covering layer.

As a result of intensive studies to solve the above problems, the present inventors have found that a correcting and covering layer containing porous silica and acid-modified rosin can have improved resistance particularly to bleeding from a line drawn with a writing instrument containing oil-based ink, and that ink for such a correcting and covering layer can have good coating property, and the resulting coating can have good flexibility, cutting property, and rewriting property, and thus have completed the present disclosure.

According to the present disclosure, it is possible to provide a pressure sensitive transfer correcting tape which exhibits excellent bleeding resistance and can prevent a line drawn with a writing instrument containing oil-based ink or aqueous ink, such as a ballpoint pen, from floating to the surface of the correcting and covering layer. In addition, the coating property (particularly thixotropic nature) and film forming property (drying property) of the correcting and covering layer ink are favorable and the flexibility, crack resistance, cutting property, and rewriting property of the correcting and covering layer are also favorable.

EXAMPLES, COMPONENTS, AND ALTERNATIVES

The following sections describe selected aspects of exemplary pressure sensitive transfer correcting tapes, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Correcting Tape

The present disclosure is directed to a pressure sensitive transfer correcting tape including: a release substrate including paper or a plastic film; and a pressure sensitive transfer layer including at least a correcting and covering layer and a pressure sensitive adhesive layer laminated sequentially on one side of the release substrate, in which the correcting and covering layer contains porous silica and acid-modified rosin.

It is preferable that the oil absorption of the porous silica is 100 ml/100 g or more. In this case, the ink absorbability, particularly oil-based ink absorbability of the correcting and covering layer is improved, and thus the bleeding resistance under high temperature and high humidity conditions is favorable and it is possible to prevent occurrence of a phenomenon in which the concealed drawn line rises with time. In addition, it is preferable that the oil absorption of the porous silica is 320 ml/100 g or less. In this case, the coating property of the correcting and covering layer ink and the flexibility and crack resistance of the correcting and covering layer do not drastically deteriorate.

The oil absorption of the porous silica is more preferably from 160 to 230 ml/100 g and particularly preferably from 180 to 230 ml/100 g when the balance among the ink absorbability, coating property, and crack resistance is taken into consideration.

The oil absorption of the porous silica is measured in conformity to JIS K5101-13-1:2004 "Pigment Test Method, Part 13: Oil Absorption, Section 1: Refined Linseed Oil Method".

It is preferable that the average particle diameter of the porous silica is about from 2 to 10 μm. This average particle diameter is a value measured by a laser scattering method.

As the porous silica, those produced by a sol-gel method, a sedimentation method and the like can be used singly or two or more kinds of those produced by the same or different production methods can be used in combination. Examples of the porous silica may include "SYLYSIA" and "SYLO- PHOBIC" manufactured by FUJI SILYSIA CHEMICAL LTD., "Mizukasil" manufactured by MIZUSAWA INDUSTRIAL CHEMICALS, LTD., "GASIL" manufactured by PQ Corporation, "SUNSPHERE H Series, L Series, and ET Series" manufactured by AGC Si-Tech Co., Ltd., and "NIPGEL" manufactured by TOSOH SILICA CORPORATION.

Among the above porous silica, those produced by a sol-gel method are preferable. For example, one prepared by reacting silicic acid or a silicate (for example, sodium silicate) with an inorganic acid such as sulfuric acid to obtain a silica sol, washing the silica sol with water, and then drying the washed silica sol can be suitably used. One obtained by adjusting the particle size of the dried one so as to have a predetermined particle size is more preferable. In the case of concurrently using porous silica produced by a sol-gel method with porous silica produced by production methods other than the sol-gel method, it is desirable to use the porous silica produced by a sol-gel method at 50% by mass or more.

The amount of the porous silica blended is preferably from 0.3% to 20% by mass, more preferably from 1% to 10% by mass, particularly preferably from 2% to 5% by mass with respect to the total amount of the solid components forming the correcting and covering layer. When the amount of the porous silica blended is 0.3% by mass or more, there is no possibility that the ink absorbability of the correcting and covering layer is insufficient and the effect of improving the bleeding resistance is insufficient. In addition, when the amount of the porous silica blended is 20% by mass or less, the concealing property of the correcting and covering layer is maintained, there is thus no possibility that the concealing power is insufficient, and there is also no possibility of deterioration in coating property due to an increase in the viscosity caused by the absorption of vehicle and the aggregation of porous silica.

The acid-modified rosin is one obtained by Diels-Alder reaction (addition reaction) of raw rosin such as gum rosin, wood rosin, or tall oil rosin with an unsaturated carboxylic acid such as (meth)acrylic acid, (anhydrous) maleic acid, fumaric acid, (anhydrous) citraconic acid, or (anhydrous) itaconic acid. It is preferable to use one produced by removing impurities such as metals from raw rosin by distillation, recrystallization, extraction, and the like and refining the raw rosin for improvement of the color tone of the resin. In addition, the acid-modified rosin can be converted into acid-modified rosin exhibiting a transparent color tone through hydrogenation. Examples of such acid-modified rosin may include Pine Crystal (registered trademark) KE-604 and Pine Crystal (registered trademark) KR-120 (all manufactured by ARAKAWA CHEMICAL INDUSTRIES, LTD.).

These acid-modified rosins have two or more carboxyl groups and thus exhibit excellent in dye capturing property. In addition, the acid-modified rosin also functions as a pigment dispersing agent, and a more uniform pigment dispersion system can be thus obtained. Hence, the bleeding resistance is improved, and a higher effect is expected as the acid value is higher. The acid value of the acid-modified rosin is preferably 180 mg KOH/g or more, more preferably 230 mg KOH/g or more, and particularly preferably 250 mg KOH/g or more. In addition, a phenomenon in which the ink viscosity is lowered by blending such acid-modified rosin in the correcting and covering layer ink is observed although the detailed action of the acid-modified rosin is not clear.

The acid value of the acid-modified rosin is a numerical value defined as the mass of potassium hydroxide in mg that is required to neutralize 1 g of the acid-modified rosin and can be measured by the method prescribed in JIS K5902 (1969) "5.4 Acid Value". In a 300 mL Erlenmeyer flask, 2 g of acid-modified rosin is accurately weighed and taken, dissolved in 50 mL of a mixture of ethyl alcohol with benzene, and titrated with a ½ N (28.05 g/L) ethyl alcoholic potassium hydroxide solution using phenolphthalein as an indicator, the time point at which the light crimson color does not disappear for 30 seconds is taken as the end point of neutralization, and the mass of potassium hydroxide in mg required for neutralization is calculated from the volume and concentration of the ethyl alcoholic potassium hydroxide solution used for titration.

It is preferable that the color tone of acid-modified rosin is 200 or less in Hazen unit. As the color tone is favorable, it is possible to prevent discoloration due to coloring and time dependent deterioration of the correcting and covering layer. In addition, it is preferable that the softening point of the acid-modified rosin is 100° C. or more. By use of acid-modified rosin having a high softening point, the heat resistance, resistance to time dependent deterioration, and cutting property of the correcting and covering layer are improved. The softening point is a value measured by a ring and ball method (JIS K5902).

The amount of the acid-modified rosin blended is preferably from 0.1% to 10% by mass, more preferably from 0.2% to 5% by mass, and particularly preferably from 0.4% to 2% by mass with respect to the total amount of the solid components forming the correcting and covering layer. When the amount of the acid-modified rosin blended is 0.1% by mass or more, it is possible to secure favorable coating property and bleeding resistance of the correcting and covering layer ink. When the amount of the acid-modified rosin blended is 10% by mass or less, deterioration in transferability and generation of cracks due to lose of flexibility of the correcting and covering layer hardly occur.

By concurrent use of the acid-modified rosin with the porous silica, the coating property and thixotropic nature of the ink are improved and it is possible to obtain a uniform and greatly flexible correcting and covering layer while maintaining favorable bleeding resistance. In this case, the ratio of the porous silica and the acid-modified rosin to be concurrently used depends on the properties of each component, but the ratio is preferably in a range of porous silica/acid-modified rosin=from 99/1 to 10/90 (mass ratio), more preferably from 98/2 to 20/80 (mass ratio), and particularly preferably from 95/5 to 40/60 (mass ratio).

The correcting and covering layer in the pressure sensitive transfer correcting tape of the present disclosure further contains a pigment (coloring material), an extender pigment, a dispersing agent, and a binder resin.

The binder resin is used as a binder for pigments and extender pigments. Examples thereof may include synthetic rubber and elastomers such as styrene-butadiene rubber (SBR), chloroprene rubber, polyisobutylene rubber, acrylonitrile-butadiene rubber (NBR), styrene-ethylene-butylene-styrene rubber (SEBS), a styrene-butylene-styrene block copolymer (SBS), a styrene-isoprene-styrene block copolymer (SIS), and urethane rubber, a poly(meth)acrylate ester resin, a polyester resin, an ethylene-vinyl acetate copolymer resin, a styrene-vinyl acetate copolymer resin, a saturated or unsaturated alicyclic hydrocarbon resin, rosin, a rosin ester, a terpene resin, a phenol resin, a xylene resin, a coumarone resin, and a ketone resin, and one kind or two or more kinds selected from these can be used in combination.

Among the binder resins, it is preferable to use synthetic rubber or elastomers and it is particularly preferable to use at least one kind selected from styrene-butadiene rubber (SBR), styrene-ethylene-butylene-styrene rubber (SEBS), or styrene-butylene-styrene block copolymer (SBS) for the reason that the elongation percentage is high and the flexibility of the correcting and covering layer can be improved.

The amount of the binder resin blended is preferably from 5% to 45% by mass, more preferably from 10% to 30% by mass, and particularly preferably from 15% to 25% by mass with respect to the total amount of the solid components forming the correcting and covering layer. It is possible to gather the pigment and the extender pigment when the amount of the binder resin blended is 5% by mass or more, and the flexibility and cutting property are favorable as a correcting and covering layer when the amount of the binder resin blended is 45% by mass or less.

As the pigment, a highly concealing white pigment such as titanium dioxide is preferable. As the titanium dioxide, both of a rutile type and an anatase type which exhibit high concealing property can be used. Specific examples thereof may include TITANIX JR-300, JR-600A, and JR-801 (all manufactured by TAYCA CORPORATION), Ti-Pure R-706, R-900, R-901, and R-931 (all manufactured by The Chemours Company), TITONE SR-1, R-310, R-650, R-3L, A-110, A-150, and R-5N (all manufactured by SAKAI CHEMICAL INDUSTRY CO., LTD.), TIPAQUE R-550, R-580, R-615, R-630, R-830, R-930, A-100, A-220, and CR-58 (all manufactured by ISHIHARA SANGYO KAISHA, LTD.), KRONOS KR-310, KR-380, KR-480, KA-10, KA-20, and KA-30 (all manufactured by Titan Kogyo, Ltd.), and Bayer Titanium R-FD-1, R-FD-2, R-FB-1, R-FB-3, R-KB-3, and R-CK-20 (all manufactured by Bayer AG, Germany), and these can be used singly or in mixture of two or more kinds thereof.

As the extender pigment, calcium carbonate, aluminum silicate, aluminosilicate, magnesium carbonate, talc, clay, silica other than the above, and the like can be used singly or in mixture of two or more kinds thereof. Examples of aluminum silicate may include KYOWAAD 700 (manufactured by Kyowa Chemical Industry Co., Ltd.), examples of aluminosilicate may include Aluminum Silicate P-820A (manufactured by Evonik Industries AG, Germany), and examples of magnesium carbonate may include light Magnesium Carbonate (manufactured by Kyowa Chemical Industry Co., Ltd.) and Magnesium Carbonate TT (manufactured by Naikai Salt Industries CO., LTD.).

It is preferable that the pigment and the extender pigment are contained in the correcting and covering layer at from 45% to 85% by mass in total. It is possible to impart sufficient concealing property to the correcting and covering layer when the total content thereof is 45% by mass or more, and the coating film forming property of the correcting and covering layer is favorable when the total content is 85% by mass or less.

The pigment is contained in the correcting and covering layer at preferably 40% by mass or more and more preferably from 50% to 80% by mass. It is possible to impart sufficient concealing property to the correcting and covering layer when the pigment is contained at 40% by mass or more, and the surface of the correcting and covering layer is smooth and there is thus no possibility of occurrence of a blocking phenomenon in which the correcting and covering layer and pressure sensitive adhesive layer sequentially laminated on the release substrate migrate to the rear side of the release substrate when the pigment is contained at 80% by mass or less.

The dispersing agent (pigment dispersing agent) is one which improves the dispersibility of titanium dioxide which is a pigment and the extender pigment, a known polymer compound, a surfactant, and the like can be selected and used depending on the kinds of pigment and extender pigment to be used. The surfactant to be used as a dispersing agent may be any of a nonionic surfactant, an anionic surfactant, or a cationic surfactant. Examples thereof may include nonionic surfactants such as sorbitan fatty acid ester, glycerin fatty acid ester, decaglycerin fatty acid ester, polyglycerin fatty acid ester, propylene glycol fatty acid ester, pentaerythritol fatty acid ester, polyoxyethylene sorbitol fatty acid ester, polyoxyethylene glycerin fatty acid ester, polyethylene glycol fatty acid ester, polyoxyethylene alkyl ether, and polyoxyethylene alkyl nonylphenol; anionic surfactants such as an alkyl sulfate, a polyoxyalkyl ether acetate, and a polyoxyalkyl ether phosphate; and cationic surfactants such as an alkyl ammonium salt and an alkyl benzyl ammonium salt;

Furthermore, if necessary, additives including a rust preventive such as benzotriazole or ethylenediaminetetraacetate, a wetting agent such as urea or ethylene urea, a preservative such as a benzothiazoline-based preservative and an omadine-based preservative, a defoaming agent such as a silicone-based defoaming agent and an acrylic defoaming agent, and a leveling agent such as a fluorine-based surfactant, or inorganic pigments and organic pigments such as carbon black, iron oxide, cobalt blue, ultramarine blue, chrome green, and chromium oxide and coloring agents such as an inorganic fluorescent pigment, an organic fluorescent pigment, a colored resin powder, a colored resin sphere, and a processed pigment can be appropriately selected and used as long as the object of the present disclosure is not impaired.

The correcting and covering layer is formed by coating and drying a correcting and covering layer ink on one side of a release substrate. It is preferable that the correcting and covering layer ink is prepared by mixing an organic solvent, a pigment, porous silica, an extender pigment, acid-modified rosin, a binder resin, a dispersing agent, and various kinds of other additives to be added if desired at predetermined proportions. For the preparation, a dispersing machine such as a disperser, a sand mill, or a bead mill may be used.

Examples of the organic solvent may include toluene, methyl ethyl ketone, ethyl acetate, cyclohexanone, and acetone. These organic solvents may be used singly or in combination of two or more kinds thereof.

As the release substrate constituting the pressure sensitive transfer correcting tape of the present disclosure, a plastic film or paper which exhibits flexural rigidity suitable for a transfer instrument having an automatic winding mechanism is preferable. Examples of the plastic film may include polyester films such as polyethylene terephthalate and polyolefin films such as polyethylene and polypropylene. The thickness of the release substrate is preferably from 3 to 30 µm. A release layer containing a silicone resin or a silicone resin in which an inorganic pigment or an organic pigment is dispersed is formed on one side or both sides of the release substrate, if necessary.

The pressure sensitive transfer correcting tape of the present disclosure is formed by sequentially coating and drying a correcting and covering layer ink and a pressure sensitive adhesive on one side of a release substrate by an ordinary method. It is preferable that the thickness of the correcting and covering layer is from 10 to 30 µm after drying in order to secure concealing property when correcting drawn lines and drawings. The ratio of the thickness of the release substrate to the thickness of the correcting and covering layer is not particularly limited, but it is generally preferable to adjust the ratio of the thickness of the release substrate to the thickness of the correcting and covering layer to be in a range of from 1:0.4 to 1:4.2.

The pressure sensitive adhesive layer to be formed on the correcting and covering layer is formed by coating and drying a pressure sensitive adhesive by a conventionally known method. As the pressure sensitive adhesive, known ones can be used, and examples thereof may include an acrylic resin-based pressure sensitive adhesive, a rosin-based pressure sensitive adhesive, a rubber-based pressure sensitive adhesive, and a vinyl-based pressure sensitive adhesive. Both a solvent type pressure sensitive adhesive and an aqueous type pressure sensitive adhesive can be used as these pressure sensitive adhesives, but a resin emulsion-based pressure sensitive adhesive is preferable and an acrylic resin emulsion-based pressure sensitive adhesive is particularly preferable. It is preferable that the thickness of the pressure sensitive adhesive layer is about from 0.3 to 5 µm after drying.

B. Example Materials and Evaluation Thereof

Hereinafter, several Example materials will be described more specifically, with reference to the tables depicted in FIGS. 1 and 2. However, the present disclosure is not limited only to the following Example materials.

Examples 1 to 24 and Comparative Examples 1 to 4

An organic solvent (toluene), an additive, a dispersing agent, acid-modified rosin, a binder resin (rubbery resin, unsaturated hydrocarbon resin) were mixed together at the proportions presented in the table of FIG. 1 and heated to dissolve the resins, then porous silica, a pigment (titanium oxide), and an extender pigment (magnesium carbonate) were added thereto, the mixture was stirred, and a mill base dispersed using a disperser was further dispersed in the mixture using a bead mill, thereby preparing a correcting and covering layer ink (coating liquid). In addition, based on Example 1, the increase and decrease in the amount of the acid-modified rosin was conducted by replacing the acid-modified rosin with an unsaturated hydrocarbon resin in an amount to be the same mass as that of the acid-modified rosin and the increase and decrease in the amount of the porous silica was conducted by replacing the porous silica with magnesium carbonate in an amount to be the same mass as that of the porous silica.

The coating liquid thus prepared was coated on a release substrate which was made of a polyethylene terephthalate film and had a thickness of 12 µm using a 75 µm applicator so as to have a thickness of from 20 to 30 µm after drying and dried, thereby forming a correcting and covering layer. The coating film state of the correcting and covering layer thus formed was visually observed and the coating property of the correcting and covering layer ink was evaluated.

After completion of the evaluation, an acrylic emulsion pressure sensitive adhesive was coated on the correcting and covering layer using a bar coater so as to have a thickness of from 0.5 to 0.8 µm after drying and dried, thereby obtaining a pressure sensitive transfer correcting tape.

The pressure sensitive transfer correcting tape thus obtained was cut into small pieces, wound into a rolled form having a width of 6 mm and a length of 10 m, and loaded in a commercially available pressure sensitive transfer correcting tape cassette (CT-CA6 manufactured by TOMBOW PENCIL CO., LTD.).

[Acid-Modified Rosin]

Pine Crystal KR-120 (acid value: 320 (mg KOH/g), softening point: 120° C., color tone: 150 Hazen, manufactured by ARAKAWA CHEMICAL INDUSTRIES, LTD.)

Pine Crystal KE-604 (acid value: 240 (mg KOH/g), softening point: 130° C., color tone: 150 Hazen, manufactured by ARAKAWA CHEMICAL INDUSTRIES, LTD.)

HARIMACK T-80 (acid value: 185 (mg KOH/g), softening point: 85° C., color tone: 8 or less Gardner, manufactured by Harima Chemicals, Inc.)

[Rosin Ester]

Ester Gum AA-L (acid value: 7 (mg KOH/g) or less, softening point: 82° C. or more, color tone: WW or more USDA, manufactured by ARAKAWA CHEMICAL INDUSTRIES, LTD.)

[Porous Silica]

SYLYSIA 350 (oil absorption: 320 (ml/100 g), sol-gel method, manufactured by FUJI SILYSIA CHEMICAL LTD.)

SUNSPHERE (oil absorption: 300 (ml/100 g), so-gel method, manufactured by AGC Si-Tech Co., Ltd.)

SYLYSIA 370 (oil absorption: 280 (ml/100 g), sol-gel method, manufactured by FUJI SILYSIA CHEMICAL LTD.)

Mizukasil P-78F (oil absorption: 230 (ml/100 g), sol-gel method, manufactured by MIZUSAWA INDUSTRIAL CHEMICALS, LTD.)

SYLYSIA 470 (oil absorption: 200 (ml/100 g), sol-gel method, manufactured by FUJI SILYSIA CHEMICAL LTD.)

Mizukasil P-73 (oil absorption: 180 (ml/100 g), sol-gel method, manufactured by MIZUSAWA INDUSTRIAL CHEMICALS, LTD.)

SYLYSIA 550 (oil absorption: 160 (ml/100 g), sol-gel method, manufactured by FUJI SILYSIA CHEMICAL LTD.)

SYLYSIA 710 (oil absorption: 100 (ml/100 g), sol-gel method, manufactured by FUJI SILYSIA CHEMICAL LTD.)

Mizukasil P-803 (oil absorption: 240 (ml/100 g), sedimentation method, manufactured by MIZUSAWA INDUSTRIAL CHEMICALS, LTD.)

<Evaluation Method>

(1) Coating Property of Correcting and Covering Layer Ink

The coating property of the correcting and covering layer ink was evaluated according to the following criteria.

◯: Correcting and covering layer in which correcting and covering layer ink is uniformly coated can be obtained.

Δ: Part of correcting and covering layer ink is not uniformly coated and correcting and covering layer is partly cracked.

x: Correcting and covering layer ink is not uniformly coated and correcting and covering layer is wholly cracked.

(2) Crack Resistance

The pressure sensitive transfer correcting tape was transferred to wood free paper and stored for 24 hours in an environment of 23° C. and 60% RH, and the surface of the correcting and covering layer was then observed and evaluated according to the following criteria.

◯: Cracking of correcting and covering layer is not observed.

Δ: Cracking is observed at part or end face of correcting and covering layer.

x: Cracking is observed on whole correcting and covering layer.

(3) Rewriting Property

The pressure sensitive transfer correcting tape was transferred to wood free paper, a line was drawn thereon with a gel ink ballpoint pen (SARASA, ball diameter: 0.7 mm, ink color: black, manufactured by ZEBRA CO. LTD.), and the state when the character was rubbed with a finger after 5 seconds elapsed was evaluated according to the following criteria.

◯: there is no elongation and adhesion of ink on any of surface of correcting and covering layer, surface of wood free paper, or finger.

Δ: there is slight elongation and adhesion of ink on surface of correcting and covering layer, surface of wood free paper, and finger (no problem in practical use).

x: there is great elongation and adhesion of ink on surface of correcting and covering layer, surface of wood free paper, and finger (problem in practical use).

(4) Bleeding Resistance

A straight line was drawn on wood free paper using an oil-based ballpoint pen (JETSTREAM, ball diameter: 0.7 mm, ink color: black, manufactured by Mitsubishi Pencil Co. Ltd.), the pressure sensitive transfer correcting tape was transferred onto the drawn line and stored for 3 hours in an environment of 60° C. and 80% RH, and the bleeding resistance was then evaluated according to the following criteria.

⊙: straight line drawn with ballpoint pen and then concealed with pressure sensitive transfer correcting tape has not risen to surface of correcting and covering layer.

◯: part of straight line drawn with ballpoint pen and then concealed with pressure sensitive transfer correcting tape has slightly risen to surface of correcting and covering layer.

Δ: straight line drawn with ballpoint pen and then concealed with pressure sensitive transfer correcting tape has wholly risen to surface of correcting and covering layer.

x: straight line drawn with ballpoint pen and then concealed with pressure sensitive transfer correcting tape has darkly risen to surface of correcting and covering layer and can be easily visually recognized (problem in practical use).

The evaluation results for the correcting and covering layer inks prepared and the pressure sensitive transfer correcting tapes obtained are presented in Tables 1 and 2.

From the results of Examples 1 to 24 and Comparative Examples 1 to 4 presented in the tables of FIGS. 1 and 2, it can be seen that a pressure sensitive transfer correcting tape having a correcting and covering layer exhibiting excellent crack resistance, rewriting property, and bleeding resistance while maintaining favorable coating property of the correcting and covering layer ink can be obtained by containing porous silica and acid-modified rosin in the correcting and covering layer.

In addition, from the results of Examples 1 to 24 presented in the table of FIG. 1, a tendency can be seen that the bleeding resistance of the correcting and covering layer is favorable in a case in which the oil absorption of porous silica is 100 ml/100 g or more and 320 ml/100 g or less. Furthermore, a tendency can be seen that a correcting and covering layer exhibiting excellent coating property and bleeding resistance is formed in a case in which the proportion of the porous silica blended is 0.3% by mass or more, particularly 1% by mass or more and 20% by mass or less, particularly 10% by mass or less with respect to the total mass of the solid components in the correcting and covering layer.

In addition, from the results of Examples 1 to 24 presented in the table of FIG. 1, it can be seen that acid-modified rosin having an acid value of 180 mg KOH/g or more can be used.

C. Illustrative Combinations and Additional Examples

This section describes additional aspects and features of pressure sensitive transfer correcting tapes of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A pressure sensitive transfer correcting tape comprising:
 a release substrate comprising paper or a plastic film; and
 a pressure sensitive transfer layer comprising at least a correcting and covering layer and a pressure sensitive adhesive layer laminated sequentially on one side of the release substrate, wherein the correcting and covering layer contains porous silica and acid-modified rosin.

A1. The pressure sensitive transfer correcting tape according to paragraph A0, wherein the porous silica has an oil absorption in a range of from 100 to 320 ml/100 g.

A2. The pressure sensitive transfer correcting tape according to any one of paragraphs A0 through A1, wherein the acid-modified rosin has an acid value of 180 mg KOH/g or more.

A3. The pressure sensitive transfer correcting tape according to any one of paragraphs A0 through A2, wherein the correcting and covering layer has a porous silica content of 0.3% to 20% by mass.

A4. The pressure sensitive transfer correcting tape according to any one of paragraphs A0 through A3, wherein the porous silica is colloidal silica obtained by gelling silicic acid or a silicate.

A5. The pressure sensitive transfer correcting tape according to any one of paragraphs A0 through A4, wherein the correcting and covering layer further contains at least one binder resin selected from synthetic rubber and an elastomer.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A pressure sensitive transfer correcting tape comprising:
a release substrate comprising paper or a plastic film; and
a pressure sensitive transfer layer comprising at least a correcting and covering layer and a pressure sensitive adhesive layer laminated sequentially on one side of the release substrate;
wherein the correcting and covering layer contains a porous first silica and an acid-modified rosin, a pigment, and an extender pigment; and
wherein the porous first silica has an oil absorption in a range of 160 to 230 ml/100 g, and wherein the correcting and covering layer has a porous silica content of 1% to 10% by mass, such that the pressure sensitive transfer layer is configured to resist bleeding from a line drawn with a writing instrument containing oil-based ink or aqueous ink, wherein the extender pigment includes magnesium carbonate.

2. The pressure sensitive transfer correcting tape according to claim 1, wherein the acid-modified rosin has an acid value of 180 mg KOH/g or more.

3. The pressure sensitive transfer correcting tape according to claim 1, wherein the porous first silica is colloidal silica obtained by gelling silicic acid.

4. The pressure sensitive transfer correcting tape according to claim 1, wherein the porous first silica is colloidal silica obtained by gelling a silicate.

5. The pressure sensitive transfer correcting tape according to claim 1, wherein the correcting and covering layer further contains at least a synthetic rubber binder resin.

6. The pressure sensitive transfer correcting tape according to claim 1, wherein the correcting and covering layer further contains at least an elastomer binder resin.

7. The pressure sensitive transfer correcting tape of claim 1, wherein the correcting and covering layer comprises a total of 45 to 85% pigment and extender pigment by mass.

8. The pressure sensitive transfer correcting tape of claim 1, wherein the extender pigment further comprises at least one substance selected from the group consisting of: calcium carbonate, aluminum silicate, aluminosilicate, talc, and a second silica.

9. A pressure sensitive transfer correcting tape comprising:
a release substrate comprising paper or a plastic film; and
a pressure sensitive transfer layer comprising at least:
a correcting and covering layer laminated onto a first side of the release substrate, the correcting and covering layer including a porous first silica, an acid-modified rosin, a pigment, and an extender pigment; and
a pressure sensitive adhesive layer laminated onto the correcting and covering layer;
wherein the porous first silica has an oil absorption in a range of 160 to 230 ml/100 g, and wherein the correcting and covering layer has a porous silica content of 1% to 10%, such that the pressure sensitive transfer layer is configured to resist bleeding from a line drawn with a writing instrument containing oil-based ink or aqueous ink, wherein the extender pigment includes magnesium carbonate; and wherein the extender pigment further comprises at least one substance selected from the group consisting of: calcium carbonate, aluminum silicate, aluminosilicate, talc, clay, and a second silica.

10. The pressure sensitive transfer correcting tape of claim 9, wherein the extender pigment comprises the second silicia.

11. The pressure sensitive transfer correcting tape of claim 9, wherein the correcting and covering layer comprises a total of 45 to 85% pigment and extender pigment by mass.

* * * * *

UNITED STATES PATENT AND TRADEMARK OFFICE
CERTIFICATE OF CORRECTION

| | |
|---|---|
| PATENT NO. | : 11,745,527 B2 |
| APPLICATION NO. | : 16/352450 |
| DATED | : September 5, 2023 |
| INVENTOR(S) | : Keitaro Kobayashi, Kazuhisa Aoki and Akihiro Sakamoto |

It is certified that error appears in the above-identified patent and that said Letters Patent is hereby corrected as shown below:

In the Claims

Column 14, Line 32, the text "silicia" should read --silica--.

Signed and Sealed this
Twenty-eighth Day of November, 2023

Katherine Kelly Vidal
*Director of the United States Patent and Trademark Office*